(No Model.) 4 Sheets—Sheet 1.
B. JACKSON.
STEERING MECHANISM FOR TRACTION ENGINES.

No. 529,495. Patented Nov. 20, 1894.

Witnesses
Edwd. Duvall Jr.
Wm. L. Boyden.

Inventor
Byron Jackson
per Fred E. Tasker,
Attorney (No Model.) 4 Sheets—Sheet 2.
B. JACKSON.
STEERING MECHANISM FOR TRACTION ENGINES.
No. 529,495. Patented Nov. 20, 1894.
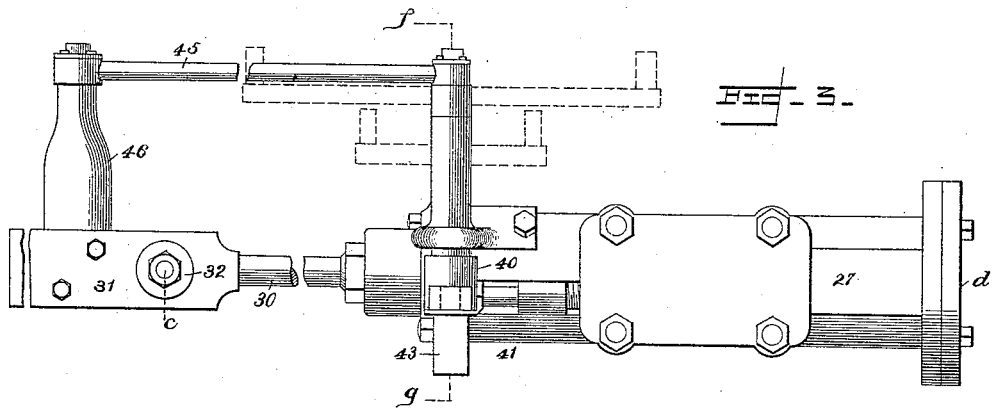
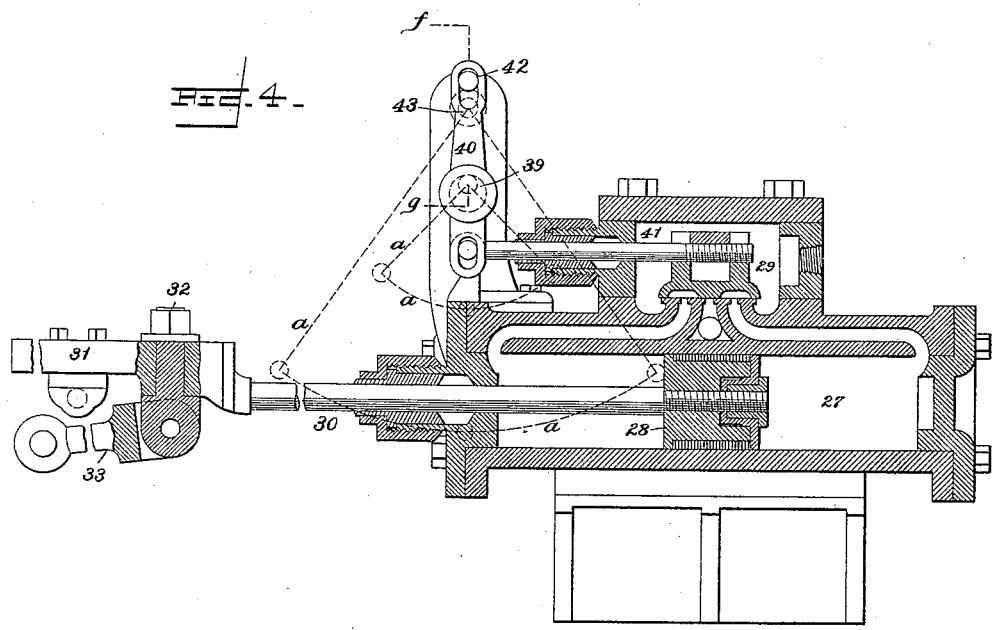
Witnesses
Edw S. Duvall Jr.
Wm L. Boyden
Inventor
Byron Jackson
per Fred E. Packer
Attorney (No Model.) 4 Sheets—Sheet 3.
B. JACKSON.
STEERING MECHANISM FOR TRACTION ENGINES.
No. 529,495. Patented Nov. 20, 1894.
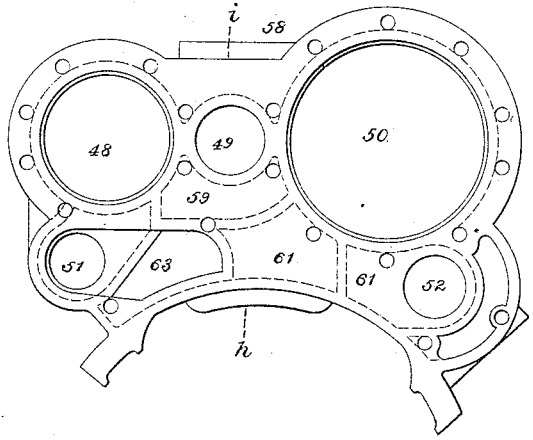
Witnesses
Edw S. Duvall, Jr.
Wm L. Boyden
Inventor
Byron Jackson
per Fred S. Packer
Attorney (No Model.) 4 Sheets—Sheet 4.
B. JACKSON.
STEERING MECHANISM FOR TRACTION ENGINES.
No. 529,495. Patented Nov. 20, 1894.
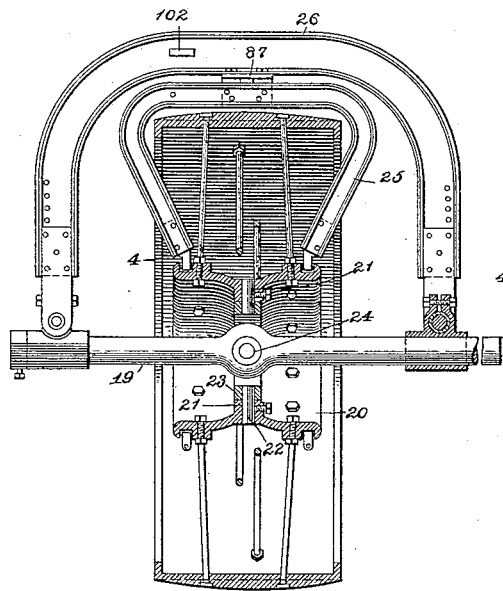
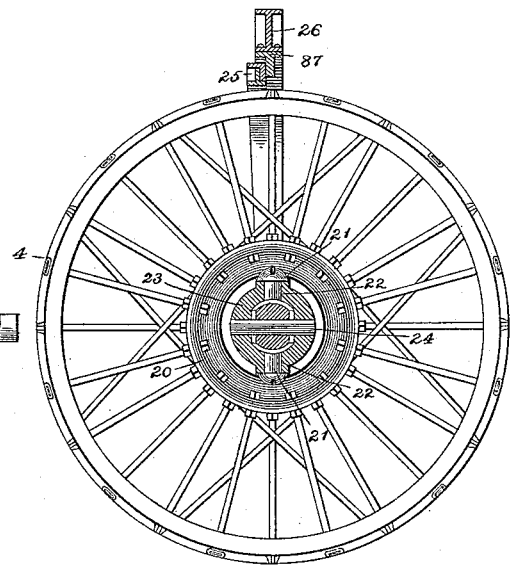

UNITED STATES PATENT OFFICE.

BYRON JACKSON, OF SAN FRANCISCO, CALIFORNIA.

STEERING MECHANISM FOR TRACTION-ENGINES.

SPECIFICATION forming part of Letters Patent No. 529,495, dated November 20, 1894.

Application filed July 8, 1893. Serial No. 479,939. (No model.)

*To all whom it may concern:*

Be it known that I, BYRON JACKSON, a citizen of the United States, residing at San Francisco, in the county of San Francisco and State of California, have invented certain new and useful Improvements in Steering Mechanism for Traction-Engines; and I do hereby declare the following to be a full, clear, and exact description of the invention, such as will enable others skilled in the art to which it appertains to make and use the same.

This invention relates to certain improvements in steering apparatus adapted for various uses, but more particularly for use with that class of machinery known as traction engines, which are adapted for hauling and also for motive power to be applied to other machines, an example of this kind of engine being given in my other pending application for Letters Patent on improvements in traction engines, filed November 6, 1890, Serial No. 370,497.

The object of the invention is to provide a steering mechanism capable of efficient and prompt action, yet simple in construction and inexpensive in the arrangement and application of its various parts.

The invention consists essentially in the construction, arrangement and combination of parts and in numerous details thereof substantially as will be hereinafter described and then more particularly pointed out in the appended claims.

Figure 1:
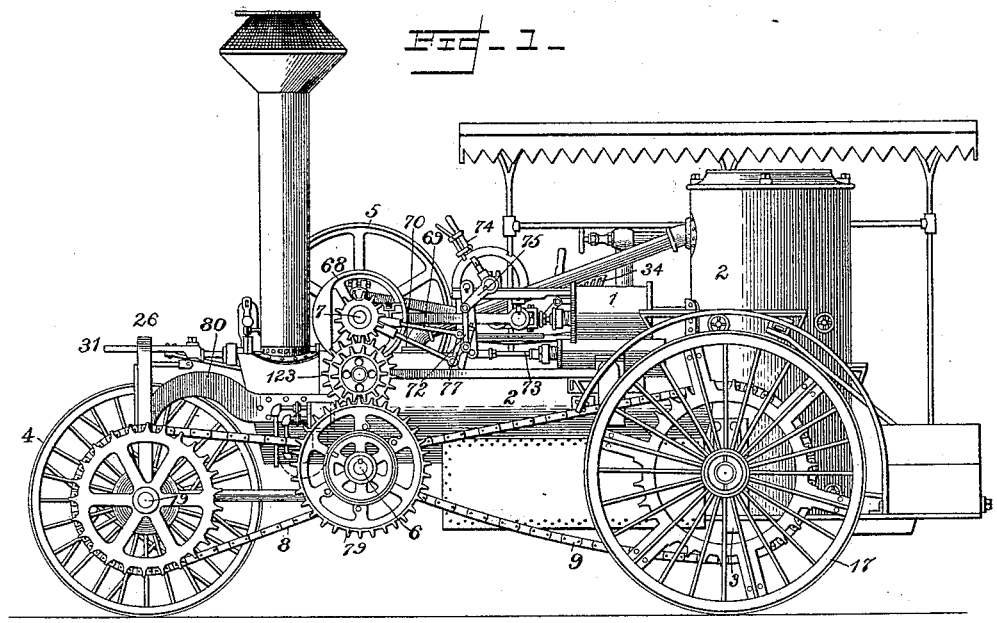
Figure 2:
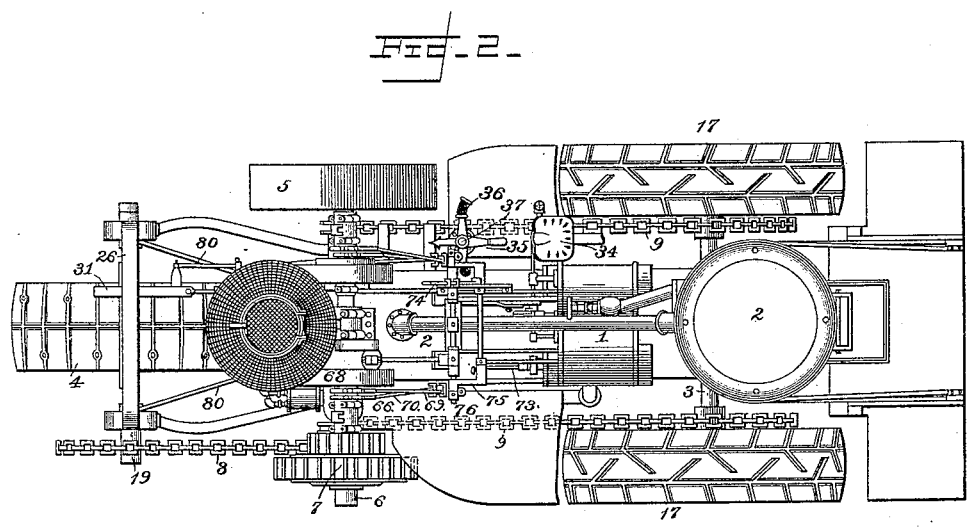

In the annexed drawings illustrating my invention: Figure 1 is a side elevation of a traction engine provided with my present improvements in steering mechanism. Fig. 2 is a plan view of the same showing the position of the various parts in a horizontal plane. Fig. 3 is a plan view of the hydraulic apparatus constituting a part of the mechanism for controlling the steering gearing of the engine. Fig. 4 is a sectional view of the same taken on the line *c d* through the axis of Fig. 3. Fig. 5 is a partial sectional view taken on the line *f g* of Figs. 3 and 4. Fig. 6 is a side view of the steering wheel of the engine, the central bearing and bow-frame being in section. Fig. 7 is a horizontal section through the steering wheel and represents a side view of the axis and connections.

Similar numerals of reference designate corresponding parts throughout all the different figures of the drawings.

Referring now more particularly to Figs. 1 and 2 of the drawings, it will be observed that the engine 1 is mounted directly upon the boiler 2, and that the rear axle 3 is attached to the boiler so as to avoid as far as possible, frame-work of any kind. There is a single wheel 4 in front. This avoids complication of parts and leaves a clear way for belts from the driving wheel 5 when the engine is employed for driving other machinery such as thrashing machines, pumping machinery, saw mills, &c.

The frames 80 extend from the boiler to the axle of the front wheel 4. The counter-shaft 6 is driven from the engine shaft 7 by means of spur gear wheels as shown in the side elevation in Fig. 1 and power is transmitted from the shaft 6 by means of pitched chains 8 and 9 to the bearing wheels 4 and 17. The front bearing or steering wheel 4 is mounted on the front axle 19 by means of a gimbal bearing, composed of members, as follows: The shell 20 forms a nave or hub for the wheel 4 to receive the spokes as shown and is provided on its interior with strong bosses 21 to receive the studs or pivot pins 22 connecting the pivoted ring 23 to the shell 20. Passing through the axle 19 and also through the sides of the ring 23, is a strong cross-stud or pivot pin 24, connecting the ring 23 and the wheel 4 to the shaft 19. These members form a gimbal or universal bearing for the wheel 4 so that it is free to turn in a horizontal plane while revolving with the axle 19 and thus permitting the engine to be steered or directed as will be hereinafter more fully explained. To prevent a deviation of the wheel in a vertical plane, I employ a yoke 25 rigidly connected to the shell or nave or hub 20, as shown in the sectional view of Fig 7, this yoke being supported by a pivoted bearing 87 to the strong bow-frame 26, whereby the wheel 4 is rigidly held in a vertical plane, but permitted to turn horizontally as before explained. The bow-frame 26 is journaled on the axle 19 as shown in Fig. 7 and sustains the front end of the boiler 2 by means of the brackets 80 as shown in Fig. 1. The yoke 25, besides keeping the wheel 4 in a vertical position is also employed in connection with other mechanism for turning it in a horizontal plane to steer or guide the engine.

Referring to the hydraulic apparatus employed for steering the engine, shown in detail in Figs. 3, 4, and 5, it will be seen that the hydraulic cylinder 27 is of the usual construction, the inlet and escape of water to opposite sides of the piston 28 being governed by the slide valve 29. The piston rod 30 has on its squared end, a squared extension 31, that takes its bearing on the bow-frame at 102, Fig. 7. To this extension 31 is attached by the swivel eye-bolt 32 a connecting link 33 which is attached at 103 to the yoke 25, Fig. 7, and by this means to the wheel 4, so that the course of the engine is directed by the position of the piston 28, and consequently controlled by the valve 29. This valve is moved by an attendant who is seated at 34, Fig. 2, within reach of the hand-guide or index pointer 35, or the foot-guide lever 36 on the same shaft 37, either or both of which can be used at pleasure. The link or connecting rod extends from the vertical guide-shaft 37, Fig. 2, to the crank 38, Fig. 5 and this turning the eccentric pin 39, moves the lever 40 and at the same time the valve-rod 41 and valve 29, thereby controlling the movement of the piston 28. As however, such movement when commenced would continue to the extreme stroke of the piston 28, I provide other gearing to govern the range of this steering movement, as follows: The lever 40 has not a fixed fulcrum at the top, but is supported there by a crank 42 on the end of the shaft 43. To the other end of the shaft 43 is attached a crank 44 and this is again connected to the extension 31 of the hydraulic piston rod 30 by the link 45 and the stud 46. See Fig. 3. Now it may be seen that when the valve 29 is moved by the hand apparatus 35, 37, 38 and 39, and the piston begins to move accordingly there is at the same time a reverse closing action by means of the link 45 and cranks 44 and 42, moving the top of the lever 40, so that a given amount of movement of the hand gearing, produces a corresponding amount of movement of the piston 28 and no more. In this way the operator or steersman can set the wheel 4 at any desired angle with reference to the engine and thus direct its course.

To determine the angle of the wheel 4 and the course of the engine, I provide a hand-guide or index pointer 35, Fig. 2, the line of which in all positions will correspond to the course the front wheel is traveling. The water to propel the piston 28, I take from the boiler feed pump and if that supply is insufficient in quick turning connection is made with the bottom of the boiler, so that the supply of water under pressure is at all times ample. The water after being used is exhausted at 47, Fig. 4, and returned to the feed water supply tank, so that but little heat is lost in thus employing the steam water supply for steering the engine.

Having thus described my invention, what I claim as new, and desire to secure by Letters Patent, is—

1. In a traction engine, the combination of the boiler, the forwardly-extending frames attached thereto, the axle journaled in said frames, the front wheel mounted on the axle by a gimbal bearing, the yoke connected to the wheel hub, the bow-frame on which the yoke is pivotally supported, said bow-frame being supported on the aforesaid axle, and a hydraulic piston whose piston-rod is connected to the bow-frame and also to the yoke, substantially as described.

2. In a traction engine, the combination of the boiler, the forwardly-extending frames attached thereto, the axle journaled in said frames, the front wheel mounted on the axle by a gimbal bearing, the yoke connected to the wheel hub, the bow-frame on which the yoke is pivotally supported, said bow-frame being supported on the axle, the hydraulic steering apparatus consisting of the hydraulic cylinder, its governing valve, the piston and piston-rod which is connected to the bow-frame and also to the yoke, and the connections whereby the attendant controls said valves, substantially as described.

3. In a traction engine, the combination of the boiler, a frame at the forward end thereof, the axle journaled in said frame, the front wheel mounted on the axle by a gimbal bearing, said wheel consisting of the shell-like hub, a rim, spokes fastened to the rim and to the hub, the interior bosses on the hub receiving the pins that connect the hub to the rings surrounding the axle and the pivot passing through the axle and said ring, the yoke connected to the hub, the bow-frame on which the yoke is pivotally supported, said bow-frame being supported on the aforesaid axle, and the hydraulic steering apparatus consisting of the hydraulic cylinder, its governing valve, its piston and piston-rod which is connected to the bow-frame and to the yoke, and connections whereby the attendant controls said valve, substantially as described.

4. In a traction engine, the combination of the boiler, the axle journaled in a frame at the forward end thereof, the front bearing and steering wheel mounted on the axle by a universal joint, the yoke connected to the hub of said wheel, the bow-frame on which the yoke is pivotally supported, said bow-frame being journaled on the aforesaid axle, the hydraulic steering apparatus consisting of the hydraulic cylinder, its governing valve, a piston and piston-rod which is connected to the bow-frame and also to the yoke, and connections whereby the attendant controls said valve, which consist of a valve-rod a vertical guide shaft, the link extending therefrom to the crank which operates an eccentric pin for moving a lever, and the valve-rod, said lever having no fixed fulcrum but supported by a crank in the end of the shaft operated by connection with the hydraulic piston-rod, substantially as described.

5. In a traction engine, the combination with the boiler and the forwardly-extending frames attached thereto, of the axle journaled in said frames, the front wheel mounted movably on said axle by a gimbal bearing, said wheel consisting of the shell-like hub, a rim, spokes fastened to the rim and the hub, interior bosses on the hub receiving the pins that connect the hub to the ring surrounding the axle, and the pivot passing through the axle and said ring and the hydraulic piston connected to the wheel in such a manner as to move it in a horizontal plane and thus direct the course in which the engine is to move, substantially as described.

In testimony whereof I affix my signature in presence of two witnesses.

BYRON JACKSON.

Witnesses:
 JAMES MASON,
 WM. L. BOYDEN.